US011401565B2

(12) United States Patent
Zhou et al.

(10) Patent No.: US 11,401,565 B2
(45) Date of Patent: Aug. 2, 2022

(54) SHEET METAL FORMING DIE LASER SURFACE HARDENING PROCESS

(71) Applicants: Dajun Zhou, Troy, MI (US); Yongjun Zhou, Rochester Hills, MI (US); Robert D Miller, Lake Orion, MI (US)

(72) Inventors: Dajun Zhou, Troy, MI (US); Yongjun Zhou, Rochester Hills, MI (US); Robert D Miller, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 179 days.

(21) Appl. No.: 16/415,448

(22) Filed: May 17, 2019

(65) Prior Publication Data

US 2020/0362426 A1 Nov. 19, 2020

(51) Int. Cl.
*C21D 1/09* (2006.01)
*B23K 26/082* (2014.01)
*C21D 9/46* (2006.01)
*B23K 26/352* (2014.01)

(52) U.S. Cl.
CPC .............. *C21D 1/09* (2013.01); *B23K 26/082* (2015.10); *C21D 9/46* (2013.01); *B23K 26/352* (2015.10)

(58) Field of Classification Search
CPC .... B23K 26/00; B23K 26/082; B23K 26/352; C21D 1/09; C21D 9/068; C21D 2221/10; C21D 1/10; C21D 9/46
See application file for complete search history.

(56) References Cited

U.S. PATENT DOCUMENTS

| 8,858,733 | B2 * | 10/2014 | Pillai ................. | B23K 26/0006 148/95 |
| 10,029,331 | B2 * | 7/2018 | De Kock ........... | B23K 26/0006 |
| 2018/0071864 | A1 * | 3/2018 | Sancho D Az ...... | B23K 26/082 |
| 2018/0155804 | A1 * | 6/2018 | Sancho D Az ...... | B23K 26/082 |

OTHER PUBLICATIONS

Asnafi, Nader, editor. Proceedings of the International Conference on Recent Advances in Manufacture & Use of Tools & Dies and Stamping of Steel Sheets: Oct. 5-6, 2004, Olofström, Sweden. Volvo Cars, 2004, (Year: 2004).*
Asnafi et al., "Laser Surface-Hardening of Dies for Cutting, Blanking or Trimming of Uncoated DP600," Recent Advances in Manufacture & Use of Tools and Dies and Stamping of Steel Sheets (Oct. 5-6, 2004) Olofstrom Sweden; pp. 169-191 (Year: 2004).*
Vilar, R. et al.; Laser Surface Treatment of Tool Steels; Optical and Quantum Electronics (1995); pp. 1273-1289.

(Continued)

*Primary Examiner* — John A Hevey
(74) *Attorney, Agent, or Firm* — Ralph E. Smith

(57) ABSTRACT

A laser beam is scanned along spaced apart side-by-side laser tracks to form corresponding spaced apart side-by-side hardened metal tracks across a binder surface of the forming die. Each hardened metal track is oriented to extend longitudinally in a direction that is normal to the metal flow direction across the binder surface during a sheet metal forming operation. The scanning forms the corresponding hardened metal tracks across the binder surface without needing to perform a post-hardening machining operation on the sheet metal forming die to remove distortion caused by the laser hardening process.

12 Claims, 2 Drawing Sheets

(56) References Cited

OTHER PUBLICATIONS

Giorleo, L. et al.; Modelling of Back Tempering in Laser Hardening; International Journal of Advanced Manufacturing Technology; Jun. 2011; 10 pp.
Gu, H et al.; Feedback Contral of Processing Temperature in Laser Beam Hardening of Production Dies; Published by Laser Institute of America (2011); 7 pp.
Magna Laser Applications in Die Manufacturing and Repair—SCFI 2018; 18 pp.
Asnafi, N. et al.; Laser Surface-Hardening of Dies for Cutting Blanking or Trimming of Uncoated DP600; Recent Advances in Manufacture & Use of Tools and Dies and Stamping of Steel Sheets (Oct. 5-6, 2004) Olofström Sweden; pp. 169-191.
Zhang, X.M. et al.; Wear and Friction Properties of Laser Surface Hardened En31 Steel; Journal of Materials Processing Technology 69 (1997); pp. 162-166.
Sam; Laser Heat Treatment of Automotive Dies—at https://www.youtube.com/watch?v=I3KOvOCXc5o (Representative images); Nov. 12, 2017; 2 pp.
Babu, P et al.; Experimental Studies on the Microstructure and Hardness of Laser Hardening of Low Alloy Steel;Transactions of the Canadian Society for Mechanical Engineering vol. 36, No. 3, 2012; pp. 241-258.

\* cited by examiner

SHEET METAL FORMING DIE LASER SURFACE HARDENING PROCESS

FIELD

The present disclosure relates to processes of surface hardening a binder of a sheet metal forming die.

BACKGROUND

The working surface of a sheet metal forming die corresponds to the areas over which there is relative sliding of the sheet metal surface during formation of the sheet metal panel. A critical portion of the working surface includes the binder surfaces of the die that extending around the die cavity to clamp the sheet metal during the forming operation. Over time, the binder surfaces of the forming die can become worn and deformed due to the repetitive action of the clamped sheet metal sliding between the binder surfaces. Therefore, the binder surfaces of the forming die typically must be hardened to a high hardness. For example, the desired hardness is typically more than about HRC 55 when forming steel sheet metal, to ensure a long die life and minimize die wear.

Traditionally, large size sheet metal forming dies are surface hardened with heat using a manual flame heat hardening process or an induction hardening process. These processes, however, tend to introduce too much heat energy and cause thermal distortion of the metal forming die. As a result, a post-hardening machining operation of the forming die is required in order to correct for this distortion. For example, the die is sometimes initially cut to leave 0.25 mm to 0.5 mm of extra material over the working surfaces. Then, the surface hardening process is performed on the forming die in this initial cut state. Thereafter, the forming die is subjected to a post-heat-treatment machining operation to remove the extra material, including any distortion caused by the heat hardening process. This includes bowing of the die as a result of material expansion across the heat treated surface (e.g., relative to the opposite, non-heat treated surface).

Long narrow portions (e.g., the cutting edges and draw bead) of metal cutting and draw dies have been hardened using a laser beam. Typically, this is done by passing the laser beam over the long narrow portion using a single laser track, or using only a very few (e.g., two) overlapping laser tracks. Such narrow elongated laser heat treatment is acceptable here, because the working (e.g., cutting or draw bead) surfaces of cutting or draw dies are long and narrow.

Laser heat hardening of sheet metal forming dies has not been broadly applied over larger or wider working surface areas because—like manual flame heat hardening process or an induction hardening process—laser heat treating such expansive working surface areas tends to cause thermal distortion of the metal forming die requiring a post-heat-treatment machining operation of the die.

SUMMARY

In one aspect, a laser heat treatment process of surface hardening a sheet metal forming die without needing to perform a post-hardening machining operation on the sheet metal forming die is provided. The process includes scanning a laser beam along spaced apart side-by-side laser tracks to form corresponding spaced apart side-by-side hardened metal tracks across a binder surface of the forming die. Each hardened metal track is oriented to extend longitudinally in a direction that is normal to the metal flow direction across the binder surface during a sheet metal forming operation. The scanning forms the corresponding hardened metal tracks across the binder surface without needing to perform a post-hardening machining operation on the sheet metal forming die.

In an aspect, the scanning includes using a single laser head to simultaneously scan a plurality of the spaced apart side-by-side laser beams to simultaneously form a corresponding plurality of the spaced apart side-by-side hardened metal tracks.

In an aspect, the scanning includes forming the corresponding spaced apart side-by-side hardened metal tracks between an edge of a forming cavity of the forming tool and a draw bead of the binder surface.

In an aspect, the scanning comprises forming at least 2 in a row of the corresponding spaced apart side-by-side hardened metal tracks across the binder surface.

In an aspect, the scanning includes forming the corresponding spaced apart side-by-side hardened metal tracks across portions of the binder surface in which adjacent metal flow directions during a sheet metal forming operation are angled toward each other.

In an aspect, the scanning includes forming a first group of the corresponding spaced apart side-by-side hardened metal tracks adjacent a first side of an inside corner oriented to extend longitudinally in a first direction; and forming a second group of the corresponding spaced apart side-by-side hardened metal tracks adjacent a second side of the inside corner oriented to extend longitudinally in a second direction.

In an aspect, the scanning includes forming a group of the corresponding spaced apart side-by-side hardened metal tracks with terminal ends that are spaced along a length of a cavity edge forming an inside corner of the cavity.

In an aspect, the scanning includes forming the corresponding spaced apart side-by-side hardened metal tracks across an entirety of the binder surface.

In an aspect, the scanning includes forming multiple groups of the corresponding spaced apart side-by-side hardened metal tracks longitudinally extending in different directions.

In an aspect, the scanning includes forming multiple groups of the corresponding spaced apart side-by-side hardened metal tracks with at least one of the groups having terminal ends that are spaced along a longitudinal length of a side of a hardened metal track of another group.

In an aspect, the scanning includes forming the corresponding spaced apart side-by-side hardened metal tracks with a hardened metal track width laterally spaced apart by a hardened metal track gap width, and with the hardened metal track width being between 1 and 5 times the hardened metal gap width.

In an aspect, the scanning includes forming the corresponding spaced apart side-by-side hardened metal tracks with a hardened metal track width laterally spaced apart by a hardened metal track gap width, and with the gap width being between 1 and 3 times a thickness of a metal sheet to be formed using the sheet metal forming die.

DRAWINGS

The present invention will become more fully understood from the detailed description and the accompanying drawings.

DETAILED DESCRIPTION

Figure 1:
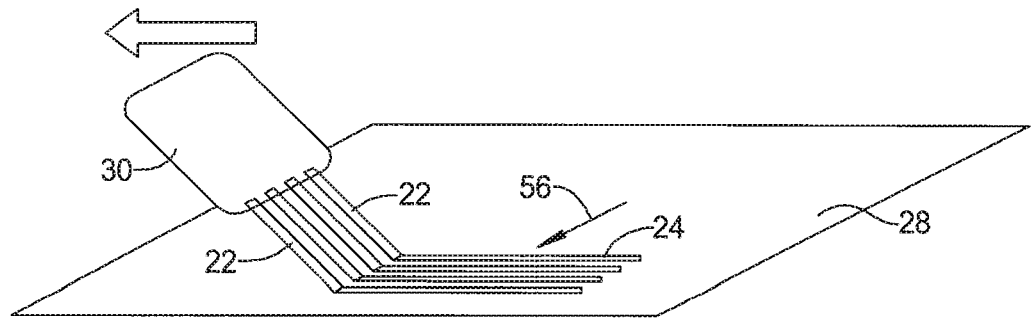
FIG. 1 is a perspective view of a single laser head simultaneously scans several spaced apart laser beams to create corresponding spaced apart corresponding hardened metal tracks laterally across a binder surface of a sheet metal forming die in accordance with one exemplary laser heat treatment process of the present disclosure.
Figure 2:
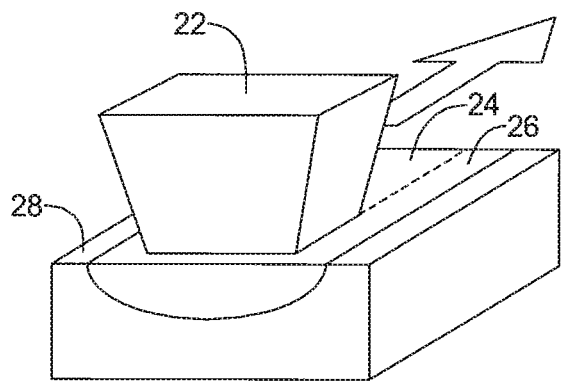
FIG. 2 is a cross-sectional perspective illustration of one of the laser beam tracks and corresponding hardened metal track resulting from the laser scanning process of FIG. 1.

Further areas of applicability will become apparent from the description, claims and drawings, wherein like reference numerals refer to like features throughout the several views of the drawings. It should be understood that the detailed description, including disclosed embodiments and drawings referenced therein are merely exemplary in nature, intended for purposes of illustration only, and are not intended to limit the scope of the present disclosure.

With reference to FIGS. 1-4, one example of a laser heat treatment process of surface hardening a sheet metal forming die 20 without needing to perform a post-hardening machining operation on the forming die 20 is described below. This example process includes scanning a laser beam 22 along spaced apart side-by-side laser tracks 24 to form corresponding spaced apart side-by-side hardened metal tracks 26.

Figure 4:
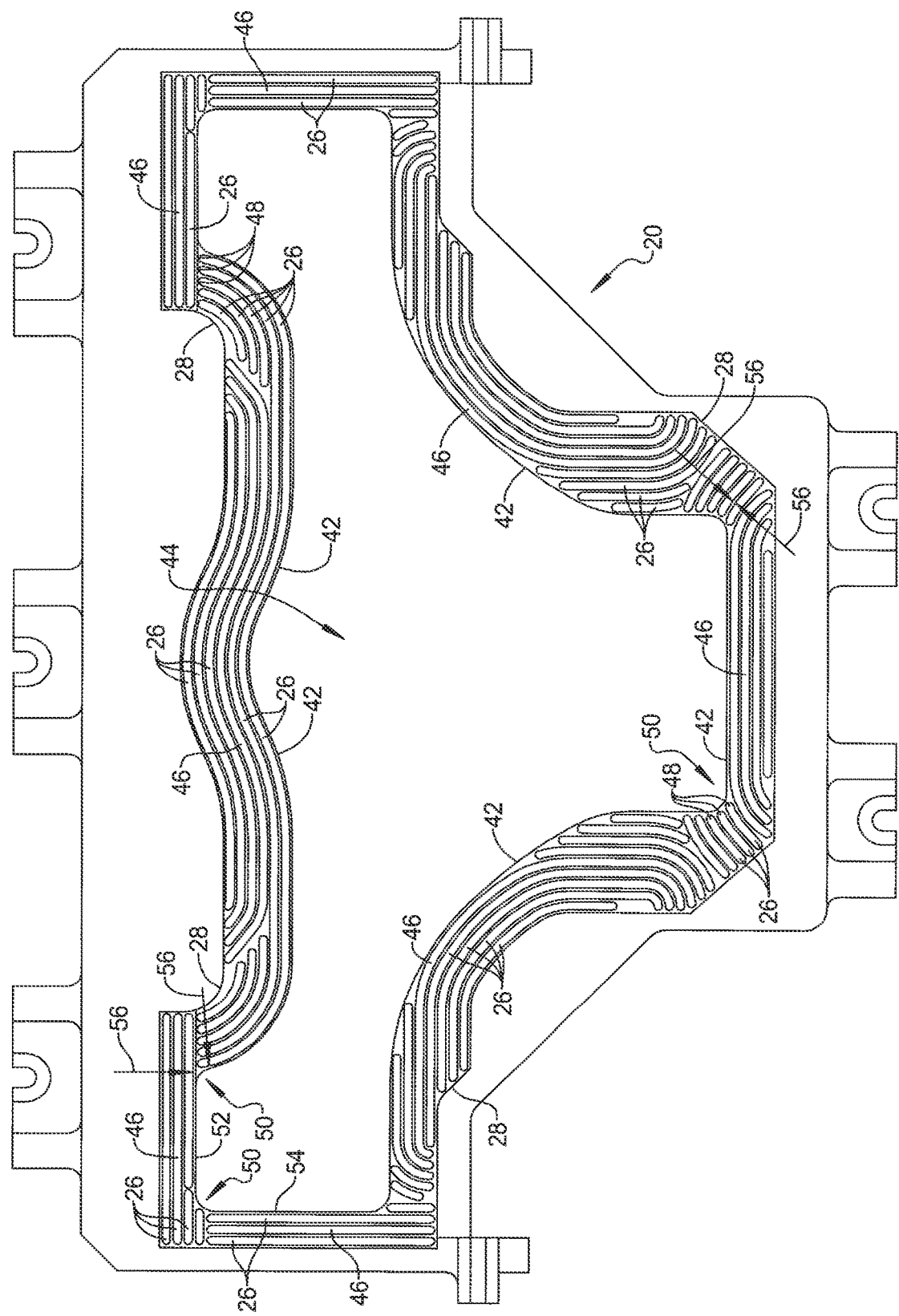
FIG. 4 is a top plan view of a metal forming die having side-by-side hardened metal tracks laterally spaced across at least a portion of a binder surface resulting from the laser scanning process of FIG. 1.

The laser tracks 24 and resulting hardened metal tracks 26 are laterally spaced across at least a portion of a binder surface 28 of the forming die 20, with each hardened metal track 26 longitudinally extending in a direction that is normal to the metal flow direction 56 across the binder surface 28 during a sheet metal forming operation. The binder surface 28 is the sheet metal clamping surface surrounding the tool cavity 44 of a metal forming die 20. The hardened metal tracks 26 of FIG. 4 are oriented to extend longitudinally in a direction that is normal to metal flow across the binder surface 28 during a sheet metal forming operation.

One way to determine the direction that is normal to the metal flow direction 56 across the binder surface 28 during a sheet metal forming operation is to use forming simulation software to identify the metal flow direction 56 at various places along the binder surface 28 of the metal forming die 20. Another way to determine the metal flow direction 56 is to view grooves that have formed in the binder surface 28 of a metal forming die 20 resulting from actual use of the forming die 20; e.g., in the early stage of the tryout, or from observation of previous used similar die. The direction of these grooves indicate the metal flow direction 56 at that area, which can be used to laser heat treat the binder surface 28 of the forming die 20 after it has been repaired, or of a replacement forming die 20.

As shown in FIG. 1, a single laser head 30 simultaneously scans a plurality (such as 4) of the spaced apart laser beams 22 along laser tracks 24 to simultaneously form a corresponding plurality of the spaced apart side-by-side hardened metal tracks 26. Alternatively or additionally, the single laser head 30 individually scans some or all of the plurality of spaced apart laser beams 22 along each of the plurality of spaced apart side-by-side laser tracks 24 to individually or separately form the corresponding hardened metal tracks 26.

The laser scanning forms the corresponding side-by-side hardened metal tracks 26 across the binder surface 28 without needing to perform a post-hardening machining operation on the sheet metal forming die 20. In other words, the forming die 20 is thereafter used without performing a post-hardening machining operation on the die 20. This is because there is no distortion of the metal forming die 20 that requires correction that results from the laser heat treating process. Without intending to be bound by theory, using spaced-apart laser tracks introduces much less heat. In addition, the metal of the laser hardened metal tracks 26 often has a larger volume than the metal prior to the laser heat treatment process. For example, when the laser hardening results in Martinsite phase transfer there is around a 4% volume expansion of the steel. The gaps 32 allow for lateral expansion of the laser hardened metal of the tracks 26, which compresses the softer metal of the gaps 32. As a result, the binder surface 28 of the die 20 does not bow globally in the way it would if the entirety of the binder surface 28 were laser hardened.

Figure 3:
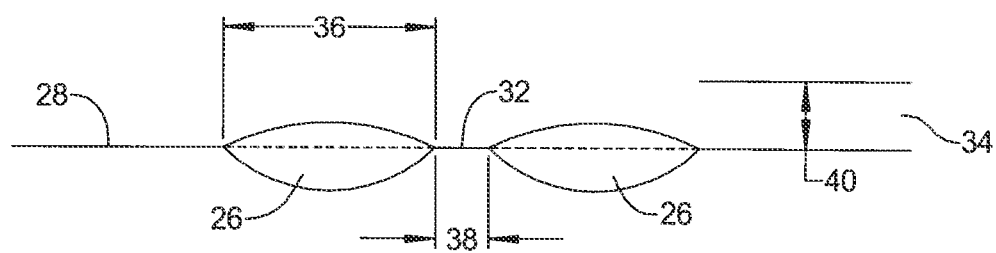
FIG. 3 is a cross-sectional side illustration showing various dimensions related to the side-by-side hardened metal track resulting from the laser scanning process of FIG. 1.

This metal expansion does cause the metal to locally bow upwardly at each individual hardened metal track 26 as shown in FIG. 3. Thus, the hardened metal tracks 26 provide raised surfaces above those of the non-hardened metal between the hardened metal tracks 26. It is desirable that the sheet metal 34 being formed rides upon the hardened metal tracks 26 and to reduce the possibility that the sheet metal 34 will contact the softer metal of the gaps 32 between the hardened metal tracks 26. For example, the hardened metal track width 36 is preferably between 1 and 3, 4, or 5 times the gap width 38. As another example, the gap width 38 is preferably between 1 and 2 or 3 times a thickness 40 of the metal sheet 34 to be formed using the sheet metal forming die 20.

In some portions or areas of the binder surface 28, the scanning includes forming the corresponding spaced apart side-by-side hardened metal tracks 26 between an edge 42 of the tool cavity 44 of the forming tool 20 and a draw bead 46 of the binder surface 28. Often, a hardened metal track 26 is formed along the entirety of the edge 42 of the cavity 44, but this edge track 26 is not shown in the drawings. In addition, a hardened metal track 26 typically extends over, or along, the draw beads 46, although the draw beads are singularly identified using reference number 46 in the drawings. In some portions of the binder surface 28, the scanning includes forming at least 2, 3, 4, or 5 in a row of the corresponding spaced apart side-by-side hardened metal tracks 26 across the binder surface (which would include any hardened metal track 26 extending along draw beads 46).

In some cases, the scanning includes forming multiple groups of the corresponding spaced apart side-by-side hardened metal tracks 26 longitudinally extending in different directions. For example in some portion or area, one group has side-by-side hardened metal tracks 26 with terminal ends 48 that are spaced along a longitudinal length of a side of a hardened metal track 26 of another group. In some portion, the scanning includes forming a group of the corresponding spaced apart side-by-side hardened metal tracks 26 with terminal ends 48 that are spaced along a length of a cavity edge 42 forming an inside corner 50 of the cavity. The shape, size and location of each group corresponds to the zones with high contact pressure and high sliding die-wear energy indicated in forming simulation.

In some portion or area, the scanning includes forming a first group of the corresponding spaced apart side-by-side hardened metal tracks 26 adjacent a first side 52 of an inside corner 50 oriented to extend longitudinally in a first direction; and forming a second group of the corresponding spaced apart side-by-side hardened metal tracks 26 adjacent a second side 54 of the inside corner 50 oriented to extend longitudinally in a second direction.

In some portion or area, the scanning includes forming the corresponding spaced apart side-by-side hardened metal tracks 26 across portions of the binder surface in which adjacent metal flow directions 56 during a sheet metal forming operation are angled toward each other. This often occurs around inside corners 50. With outside corners, for example, adjacent metal flow directions 56 are typically angled away from each other.

The scanning of the binder surface 28 in the illustrated example includes forming the corresponding spaced apart side-by-side hardened metal tracks 26 across an entirety of the binder surface 28. Alternatively, the scanning includes leaving a portion of the binder surface 28 without any spaced apart side-by-side hardened metal tracks. For example, when hardening is deemed unnecessary in an area due to low contact pressure and sliding energy identified from forming simulation or previous observation.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A laser heat treatment process of surface hardening a binder surface around a die cavity of a sheet metal forming die without needing to perform a post-hardening machining operation on the sheet metal forming die, the process comprising:
    scanning a laser beam along spaced apart side-by-side laser tracks to form corresponding spaced apart side-by-side hardened metal tracks across the binder surface of the forming die, with each hardened metal track extending longitudinally in a direction that maintains an orientation that is normal to a local metal flow direction across each hardened metal track of the binder surface during a sheet metal forming operation with the forming die;
    wherein the scanning forms the corresponding hardened metal tracks across the binder surface without needing to perform a post-hardening machining operation on the sheet metal forming die.

2. The laser heat treatment process of claim 1, wherein the scanning comprises using a single laser head to simultaneously scan two or more of the spaced apart side-by-side laser tracks to simultaneously form a corresponding two or more of the spaced apart side-by-side hardened metal tracks.

3. The laser heat treatment process of claim 1, wherein the scanning comprises forming the corresponding spaced apart side-by-side hardened metal tracks between an edge of a forming cavity of the forming tool and a draw bead of the binder surface.

4. The laser heat treatment process of claim 1, wherein the scanning comprises using a single laser head to simultaneously scan four or more of the spaced apart side-by-side laser tracks to simultaneously form a corresponding four or more of the spaced apart side-by-side hardened metal tracks.

5. The laser heat treatment process of claim 1, wherein the scanning comprises forming the corresponding spaced apart side-by-side hardened metal tracks across portions of the binder surface in which adjacent local metal flow directions during a sheet metal forming operation are angled toward each other.

6. The laser heat treatment process of claim 1, wherein the scanning comprises: forming a first group of the corresponding spaced apart side-by-side hardened metal tracks adjacent a first side of an inside corner oriented to extend longitudinally in a first direction; and forming a second group of the corresponding spaced apart side-by-side hardened metal tracks adjacent a second side of the inside corner oriented to extend longitudinally in a second direction.

7. The laser heat treatment process of claim 1, wherein the scanning comprises forming a group of the corresponding spaced apart side-by-side hardened metal tracks with terminal ends that are spaced along a length of a cavity edge forming an inside corner of the cavity.

8. The laser heat treatment process of claim 1, wherein the scanning comprises forming the corresponding spaced apart side-by-side hardened metal tracks across an entirety of the binder surface.

9. The laser heat treatment process of claim 1, wherein the scanning comprises forming multiple groups of the corresponding spaced apart side-by-side hardened metal tracks longitudinally extending in different directions.

10. The laser heat treatment process of claim 1, wherein the scanning comprises forming multiple groups of the corresponding spaced apart side-by-side hardened metal tracks with at least one of the groups having terminal ends that are spaced along a longitudinal length of a side of a hardened metal track of another group.

11. The laser heat treatment process of claim 1, wherein the scanning comprises forming the corresponding spaced apart side-by-side hardened metal tracks with a hardened metal track width laterally spaced apart by a hardened metal track gap width, and with the hardened metal track width being between 1 and 5 times the hardened metal gap width.

12. The laser heat treatment process of claim 1, wherein the scanning comprises forming the corresponding spaced apart side-by-side hardened metal tracks with a hardened metal track width laterally spaced apart by a hardened metal track gap width, and with the gap width being between 1 and 3 times a thickness of a metal sheet to be formed using the sheet metal forming die.

* * * * *